Jan. 21, 1936.  H. F. ELLIOTT  2,028,198

AUTOMATIC CLUTCH CONTROL

Filed Feb. 23, 1932

Inventor
Harold F. Elliott
John Flam
Attorney

Patented Jan. 21, 1936

2,028,198

UNITED STATES PATENT OFFICE 2,028,198

AUTOMATIC CLUTCH CONTROL

Harold F. Elliott, Palo Alto, Calif.

Application February 23, 1932, Serial No. 594,545

4 Claims. (Cl. 192—.01)

This invention relates to automotive vehicles, and particularly to the clutch mechanism for controlling the connection of the propelling means to the transmission or wheels of the vehicle.

In the usual type of automotive vehicle, the propeller shaft is connected to the transmission by a clutch. This clutch is usually of the cone or disc type, in which the cooperating parts can be separated by depressing a clutch pedal. Such separation is desirable or necessary when shifting gears (that is, when varying the ratio of transmission from the engine to the propeller shaft), or for coasting. Such coasting has lately been referred to as free wheeling.

It has been proposed to provide a power mechanism for making it possible to release the clutch, as by the aid of a vacuum cylinder, so as to relieve the driver from the necessity of strongly urging the clutch pedal downward. This can be accomplished for example by a push button operating a valve in the vacuum line from the intake manifold, which line leads to the operating cylinder. However, in such schemes it has been necessary to keep the button depressed.

It is one of the objects of my invention to make it possible to keep the power mechanism that holds the clutch in released position, active for any desired period without the necessity of holding the button; and also to return the clutch to engaging position at will.

My invention possesses many other advantages, and has other objects which may be made more easily apparent from a consideration of one embodiment of my invention. For this purpose I have shown a form in the drawing accompanying and forming part of the present specification. I shall now proceed to describe this form in detail, which illustrates the general principles of my invention; but it is to be understood that this detailed description is not to be taken in a limiting sense, since the scope of my invention is best defined by the appended claims.

Referring to the drawing.

Figure 1:
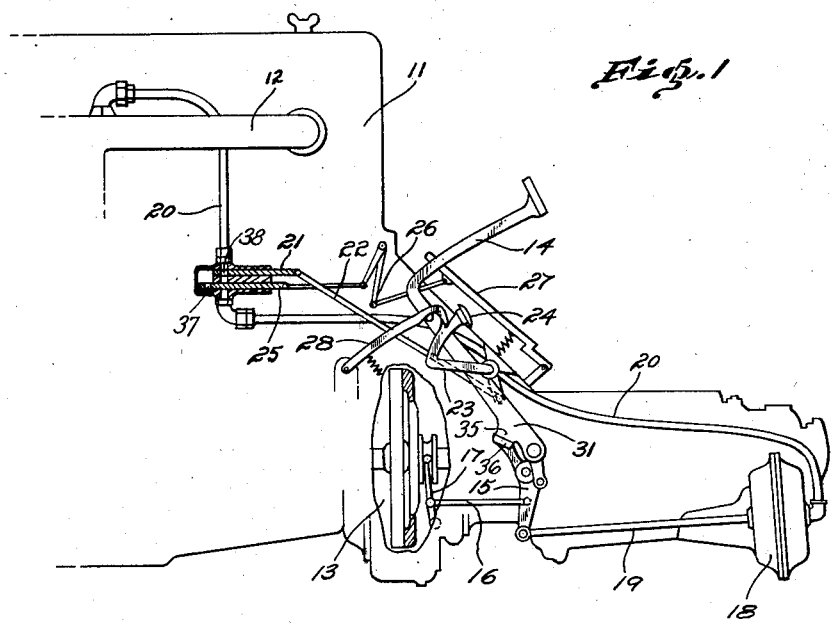
Figure 1 is a diagram of the system, showing the engine only in outline.

In Fig. 1 there is disclosed a gasoline engine 11 having an intake manifold 12 in which a suction is produced by the action of the engine pistons. The transmission of power to the vehicle is completed by a separable clutch device, such as 13. This clutch can be disengaged as for example by a downward thrust on a pedal 14. This pedal has a flat portion 35, which is arranged to contact a boss 36 on crank 15, to urge it downwardly when pedal 14 is depressed. A link 16 connects crank 15 with a shift fork 17. The shift fork 17 acts to move one of the clutch elements axially to disengaging position, whenever link 16 is moved to the right as pedal 14 is depressed. Since this type of mechanism is all old and well known, further explanation is considered unnecessary.

Alternate means for operating the clutch 13 is shown, by the aid of a power mechanism. Thus crank 15 can be actuated to clutch disengaging position by the aid of a vacuum cylinder 18 operating, when under vacuum, to pull rod 19 pivoted to crank 15, toward the right. This movement rotates crank 15 to the clutch disengaging position.

The source of vacuum or suction can conveniently be the intake manifold 12. Thus a conduit 20 can lead from this manifold into the space of cylinder 18. The left hand side of the cylinder 18 is of course vented to the atmosphere. A slide valve 21 controls the passageway in conduit 20. This valve can be opened as by link 22 and a lever 23. This lever has a knob 24 which is arranged for convenient manual control, as by the foot of the operator. Spring means 34 can be used to return the valve 21 to closed position when the button or knob 24 is released.

It is thus apparent that if the clutch 13 is to be disengaged, it can be alternatively accomplished by pressing button 24 or pedal 14. However, in the present arrangement, there is shown a supplemental slide valve 25 for controlling the passageway in conduit 20, which normally closes this passageway. By the aid of a link mechanism 26, the throttle control pedal or "accelerator" 27 is connected to this valve. When this pedal 27 is released for idling the motor or for slowing down, the pedal rocks upwardly and opens conduit 20. Thus cylinder 18 can be made active only under engine idling conditions. When the accelerator pedal is thus released, button 24 can be used to disengage the clutch 13. Vents comprising slots 37 and 38 are provided on the under side of slide valves 25 and 21. These slots open the lower section of conduit 20 to the atmosphere and allow the clutch 13 to engage when valve 25 is moved to the left by pressing accelerator pedal 27. The vents also allow the clutch to engage whenever pedal 27 and pedal 24 are both up.

Figure 2:
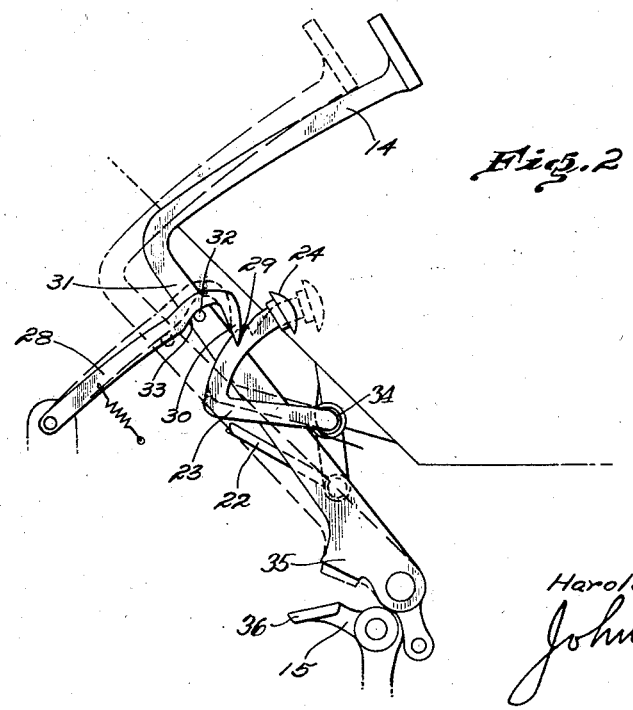
Fig. 2 is an enlarged detail view of the clutch pedal and its associated parts.

I provide a latch for holding lever 23 depressed, thereby permitting the vehicle to coast without the necessity of holding the foot on the button 24. This can take the form of a spring pressed latch 28 arranged to engage in a notch 29 in lever 23, to hold it in clutch releasing position. This latch is shown in active holding position in both Figs. 1 and 2, and in inactive position in the alternate position shown in dotted lines in Fig. 2. As button 24 is depressed, the hook 30 slides over the arcuate portion of lever 23 and drops behind the notch 29 upon full depression.

In order to make it possible at will to release lever 23, in this instance it is only necessary to depress pedal 14 slightly. Thus the pedal lever 31 carries a pin 32 which engages a cam surface 33 on the lower side of latch 28. As the pin is moved downwardly by the movement of pedal 14, the latch is lifted by the aid of the cam surface 33. Then as lever 23 springs back to the position shown in dotted lines in Fig. 2, the pedal 14 can be released. Only a slight downward movement of pedal 14 is required to effect this, and it does not materially affect the operation of the vehicle.

The mode of operation of the system can now be set forth. Under normal running conditions, without "free wheeling", button 24 is raised, and valve 21 is closed, interrupting the passage through conduit 20. Therefore, vacuum cylinder 18 is inactive, and the clutch 13 is solely under the control of pedal 14.

Now if "free wheeling" operation is desired, button 24 is depressed, and is held in the position of Fig. 1 by latch 28. Under such circumstances, the automobile can be propelled by depressing accelerator 27. This condition is shown in Fig. 1. The clutch 13 is still in engagement, since accelerator pedal 27 is depressed, and cylinder 18 is still inactive, valve 25 interrupting the conduit 20.

However, as soon as pedal 27 is released, clutch 13 is disengaged, because valve 25 opens conduit 20, and cylinder 18 becomes active. The car is now under "free wheeling".

To place the clutch 13 again under the control of pedal 14, it is merely necessary to depress pedal 14 slightly. This act causes pin 32 to release catch 28, and lever 23 is returned to a position where valve 21 interrupts conduit 20. The releasing operation of lever 23 is indicated in dotted lines in Fig. 2.

The mechanism including conduit 20, and cylinder 18 can be designated a "free wheeling mechanism", and valves 21, 25, and levers 24 and 26 can be designated as a control means for this free wheeling mechanism.

I claim:

1. In a control mechanism for power transmission to an engine operated vehicle, a clutch, power means for operating the clutch including a manually controlled member which when operated causes the clutch to be released, a manually controlled member for alternatively manually disengaging the clutch, a latch for holding the member that operates the power means, and means whereby the latch is released when the manual disengaging means is moved.

2. In a control mechanism for transmission of power from an internal combustion engine to a vehicle, said engine having an intake manifold, a clutch, a suction operated device for operating the clutch, including a conduit to the manifold, as well as a manually controlled member for controlling the passageway through the conduit, a manually controlled pedal for alternatively manually disengaging the clutch, a latch for holding the passageway controlling member in position to hold the passageway open, and means whereby the latch is released when the pedal is given a slight clutch disengaging movement.

3. In an automotive vehicle having an engine, a transmission, a driving clutch between the engine and the transmission, a main clutch pedal for manual control of the driving clutch, a throttle for the engine, and auxiliary means for automatically operating the clutch in cooperation with the operation of the throttle, the combination of a member for holding said auxiliary means in condition for automatic clutch operation, and means whereby manual control of the clutch is restored when the main clutch pedal is at least partly depressed.

4. In an automobile having an engine, an accelerator pedal, a clutch, a clutch control member, and a mechanism for permitting the automobile to coast free of the engine when the accelerator pedal is released, an auxiliary control member for rendering said mechanism effective, a latch for holding the mechanism in its effective condition, and means actuated by the clutch control member for disengaging the latch.

HAROLD F. ELLIOTT.